United States Patent
Jaiswal et al.

(10) Patent No.: US 8,855,615 B2
(45) Date of Patent: Oct. 7, 2014

(54) SHORT MESSAGING SERVICE FOR EXTENDING CUSTOMER SERVICE DELIVERY CHANNELS

(75) Inventors: Peeyush Jaiswal, Boca Raton, FL (US); Naveen Narayan, Flower Mound, TX (US)

(73) Assignee: International Business Machines Corporation, Armonk, NY (US)

( * ) Notice: Subject to any disclaimer, the term of this patent is extended or adjusted under 35 U.S.C. 154(b) by 879 days.

(21) Appl. No.: 12/197,847

(22) Filed: Aug. 25, 2008

(65) Prior Publication Data

US 2010/0048227 A1    Feb. 25, 2010

(51) Int. Cl.
- *H04L 29/08*    (2006.01)
- *H04W 4/00*    (2009.01)
- *H04M 3/493*    (2006.01)
- *H04M 3/42*    (2006.01)
- *H04W 4/14*    (2009.01)

(52) U.S. Cl.
CPC .......... *H04M 3/42382* (2013.01); *H04M 3/493* (2013.01); *H04M 3/4938* (2013.01); *H04W 4/14* (2013.01)
USPC ........................................ 455/414.4; 455/466

(58) Field of Classification Search
USPC .............. 455/466, 414.1, 414.2, 414.3, 414.4
See application file for complete search history.

(56) References Cited

U.S. PATENT DOCUMENTS

| | | | |
|---|---|---|---|
| 5,627,884 A * | 5/1997 | Williams et al. | 379/88.16 |
| 6,301,484 B1 * | 10/2001 | Rogers et al. | 455/466 |
| 6,731,735 B1 * | 5/2004 | Cook | 379/207.11 |
| 6,754,334 B2 | 6/2004 | Williams et al. | |
| 6,813,507 B1 * | 11/2004 | Gress et al. | 455/466 |
| 6,956,941 B1 | 10/2005 | Duncan et al. | |
| 7,197,122 B2 * | 3/2007 | Vuori | 379/88.25 |
| 7,277,696 B2 * | 10/2007 | Preiss et al. | 455/414.4 |
| 7,715,857 B2 * | 5/2010 | Montemer et al. | 455/466 |
| 2004/0242246 A1 * | 12/2004 | Lee et al. | 455/466 |
| 2005/0259806 A1 * | 11/2005 | Chang | 379/218.01 |
| 2006/0166666 A1 * | 7/2006 | Roach, Jr. | 455/433 |
| 2007/0294096 A1 * | 12/2007 | Randall et al. | 705/1 |

* cited by examiner

*Primary Examiner* — Christopher M Brandt
(74) *Attorney, Agent, or Firm* — Yee & Associates, P.C.; John R. Pivnichny (57) ABSTRACT

A computer implemented method, a computer program product, and a data processing system use short messaging service for extending customer service deliver channels. A message utilizing a short messaging service protocol is received from a sender. Responsive to receiving the message utilizing the short messaging service protocol, the message is parsed into a voice extensible markup language document. A virtual service request is then created from the voice extensible markup language document. Responsive to creating the virtual service request from the voice extensible markup language document, a service is requested from a message recipient, facilitated by using the virtual service request. A non-textual response is then provided to the message sender.

18 Claims, 4 Drawing Sheets

SHORT MESSAGING SERVICE FOR EXTENDING CUSTOMER SERVICE DELIVERY CHANNELS

BACKGROUND OF THE INVENTION

1. Field of the Invention

The present application relates generally a computer implemented method, a computer program product, and a data processing system. More specifically the present application relates to a computer implemented method, a computer program product, and a data processing system for using short messaging service for extending customer service deliver channels.

2. Description of the Related Art

In general, short messaging service, or SMS, is a data delivery mechanism. A sending party of a short messaging service message sends a datagram to a recipient. The recipient can then read and interpret the short messaging service message before sending a response back to the sending party.

Short messaging service works on a store-and-forward basis. Instead of being sent directly to the recipient, short messaging service messages travel through several important nodes, typically including several short messaging service centers, before reaching the recipient. In general, short messaging service messages are network and format limited to 160 characters.

Short messaging service has the capability of generating return receipts. Responsive to delivery of the short messaging service message to the recipient, the sender of the short messaging service message can get a new short messaging service message confirming delivery of the original short messaging service message to the recipient. Additionally, special services, such as weather, stock quotes, and brief driving directions, and also be generated using a short messaging service query from the sender.

However, all short messaging services are text only or data only. There is no intermixing of media channels. A short messaging service message is delivered to either a mobile subscriber, or a service provider. The service provider can then parse the message and generate an automated response. The initial short messaging service message can be responded to with a text automated response, or with a requested data automated response such as when downloading a ring tone.

BRIEF SUMMARY OF THE INVENTION

A computer implemented method, a computer program product, and a data processing system use short messaging service for extending customer service deliver channels. A message utilizing a short messaging service protocol is received from a sender. Responsive to receiving the message utilizing the short messaging service protocol, the message is parsed into a voice extensible markup language document. A virtual service request is then created from the voice extensible markup language document. Responsive to creating the virtual service request from the voice extensible markup language document, a service is requested from a message recipient, facilitated by using the virtual service request. A non-textual response is then provided to the message sender.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer usable or computer readable medium may be any medium that can contain, store, communicate, propagate, or transport the program for use by or in connection with the instruction execution system, apparatus, or device. The computer usable medium may include a propagated data signal with the computer usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer or other programmable data processing apparatus to function in a particular manner, such that the instructions stored in the computer readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
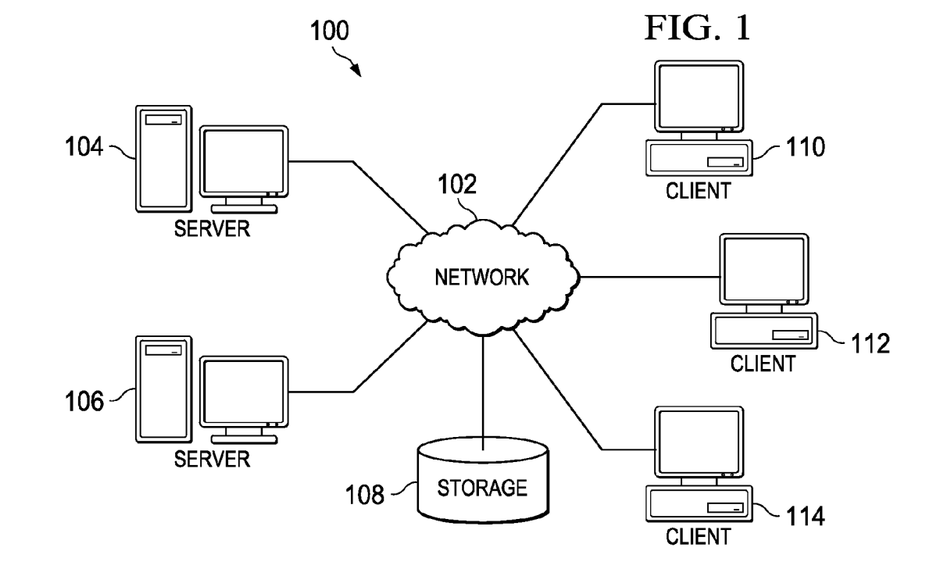
FIG. 1 is a pictorial representation of a network of data processing systems in which illustrative embodiments may be implemented.
Figure 2:
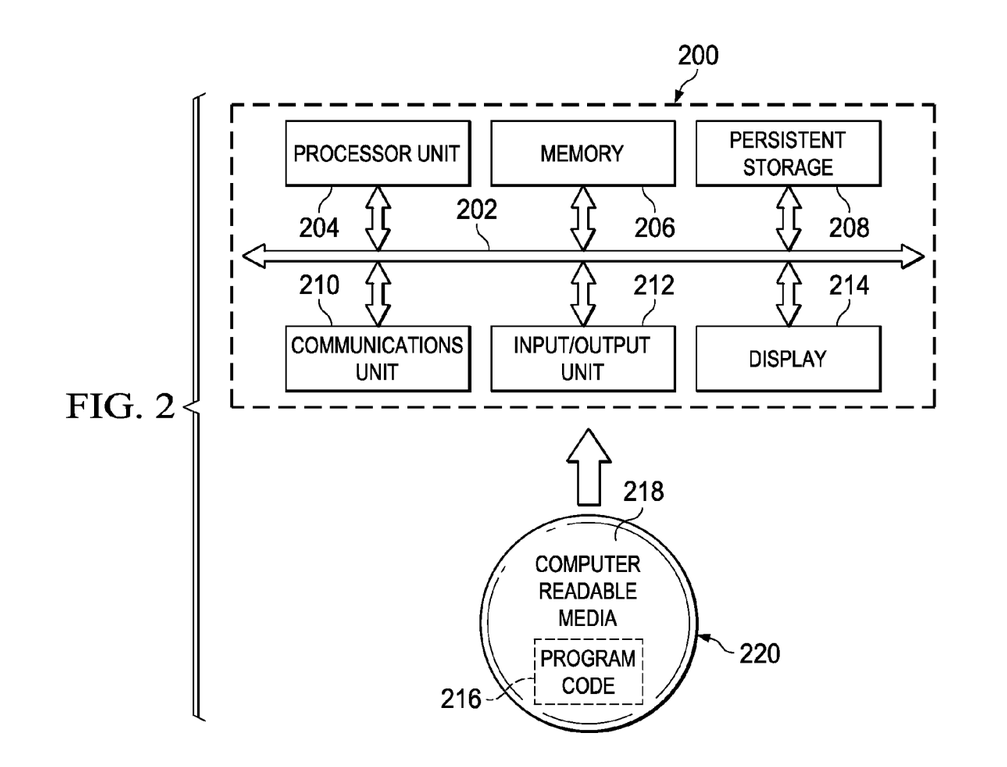
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments tie the invention to the figure—talk about how embodiments can be used in network data processing system 100

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

The illustrative embodiments herein describe computer implemented method, a computer program product, and a data processing system for using short messaging service for extending customer service deliver channels. Customer service deliver channels are those communication protocols by which on demand services are provided to customers. Other service delivery channels can be used in the request/response model typical of short messaging service technology. The response can utilize a different channel than data, or short messaging service message responses. A short messaging service message can be transmitted by a user to a contact center. The contact center/data center can incorporate specific logic to processes the short messaging service message. The processing of the short messaging service by the data center alleviates the use of a traditional voice user interface (VUI) for service. Instead, the text in the short messaging service message can be interpreted by the business logic and non-textual response can be provided to the message generating body.

A computer implemented method, a computer program product, and a data processing system use short messaging service for extending customer service deliver channels. A message utilizing a short messaging service protocol is received from a sender. Responsive to receiving the message utilizing the short messaging service protocol, the message is parsed into a voice extensible markup language document. A virtual service request is then created from the voice extensible markup language document. Responsive to creating the virtual service request from the voice extensible markup language document, a service is requested from a message recipient, facilitated by using the virtual service request. A non-textual response is then provided to the message sender.

Figure 3:
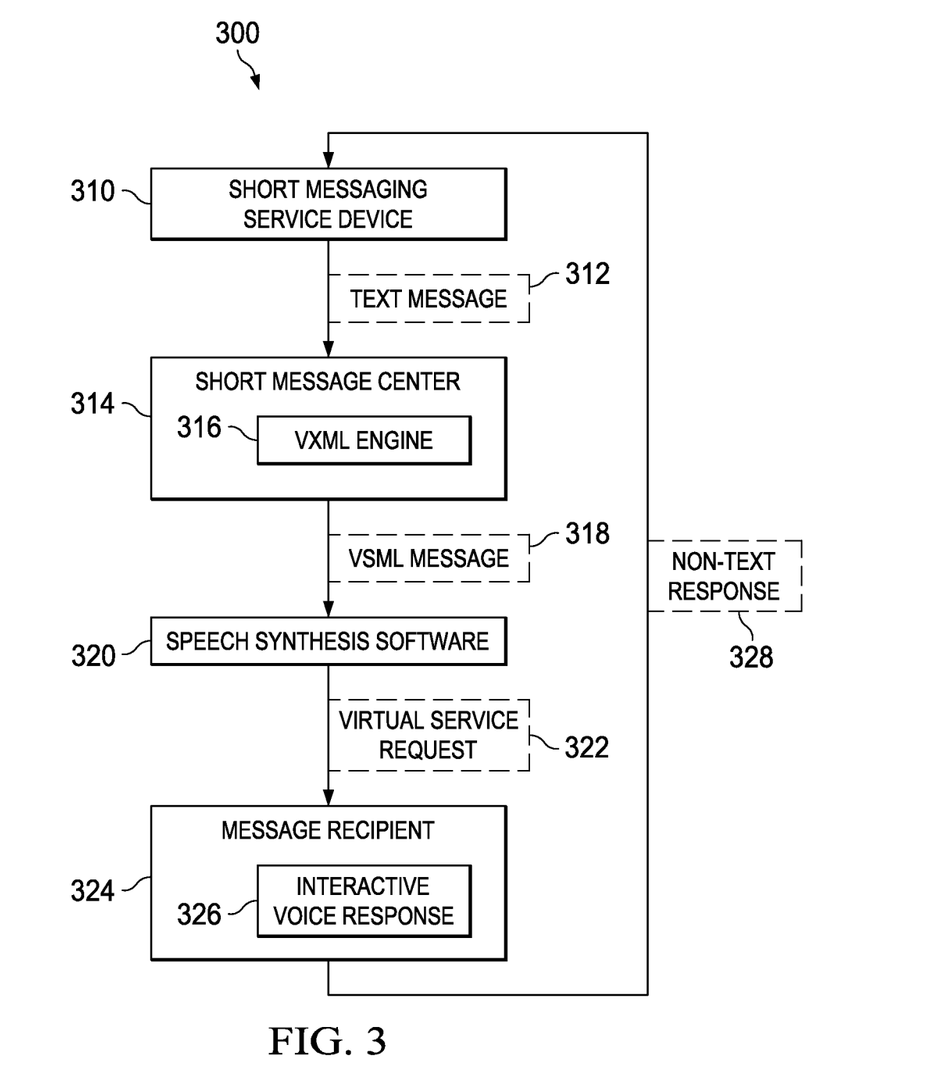
FIG. 3 is a data flow for providing a short messaging service delivery channel extension according to an illustrative embodiment.

Referring now to FIG. 3, a data flow is shown for providing a short messaging service delivery channel extension according to an illustrative embodiment. Short messaging service device 310 is a device capable of sending and receiving messages utilizing the short messaging service protocol. Short messaging service device 310 can be client 110-114 of FIG. 1.

Short messaging service device 310 receives a user input of text message 312. Text message 312 is a short messaging service message. Short messaging service device 310 then forwards text message 312 to short message center 314. Short message center 314 is a data processing center capable of processing messages that utilize the short messaging service protocol. Short message center 314 can be server 104 of FIG. 1.

Voice extensible markup language engine 316 at short message center 314 parses text message 312 from short messaging service device 310 into voice extensible markup language document, or voice extensible markup language message 318. Voice extensible markup language engine 316 is a software component that receives text message 312 as input, parses text message 312, and creates voice extensible markup language (VXML) message 318. Voice extensible markup language message 318 is a voice extensible markup language document containing the instructions from text message 312, formatted for use by a software engine in which voice extensible markup language documents can be used as input. Voice extensible markup language is an XML format for specifying interactive voice dialogues between a human and a computer.

Speech synthesis software 320 is a software component that converts voice extensible markup language message 318 into virtual service request 322. Speech synthesis software 320 can be a software process that creates virtual service request 322 by concatenating pieces of stored recorded speech, such as phones, diaphones of entire words and sentences. Alternatively, speech synthesis software 320 can be a software process that creates virtual service request 322 by incorporating a model vocal tract and other human voice characteristics. Virtual service request 322 is, for example, an audio datagram, packet, audio file or other voiced representation of voice extensible markup language message 318.

Speech synthesis software 320 can be a software component implemented at short message center 314, such that short message center 314 provides message recipient 324 with virtual service request 322. Alternatively, speech synthesis software 320 can be a software component implemented at message recipient 324, such that short message center 314 provides message recipient 324 with voice extensible markup language message 318 that is then locally converted to virtual service request 322.

Short message center 314 then makes a service call to message recipient 324. The service call will include either voice message 322 or voice extensible markup language message 318, depending on where speech synthesis software 320 is implemented.

Message recipient 324 is a data processing system, such as data processing system 200 of FIG. 2. Message recipient includes interactive voice response 326. Interactive voice response 326 is a software component that that allows message recipient 324 to detect voice and touch tones using a normal phone call. Interactive voice response 326 can respond with pre-recorded or dynamically generated audio to then process more specific requests. Interactive voice response 326 can be used to control almost any function where the interface can be broken down into a series of simple menu choices.

Interactive voice response 326 can then be navigated utilizing virtual service request 322. Message recipient 324 then generates non-text response 328, and forwards non-text response 328 to short messaging service device 310.

Non-text response 328 is a response to text message 312. Non-text response 328 is not a response utilizing the short messaging service protocol. Non-text response 328 can be a telephone call from an operator or customer service representative at message recipient 324. Non-text response 328 can be a prerecorded or generated voice message from message recipient 324.

Figure 4:
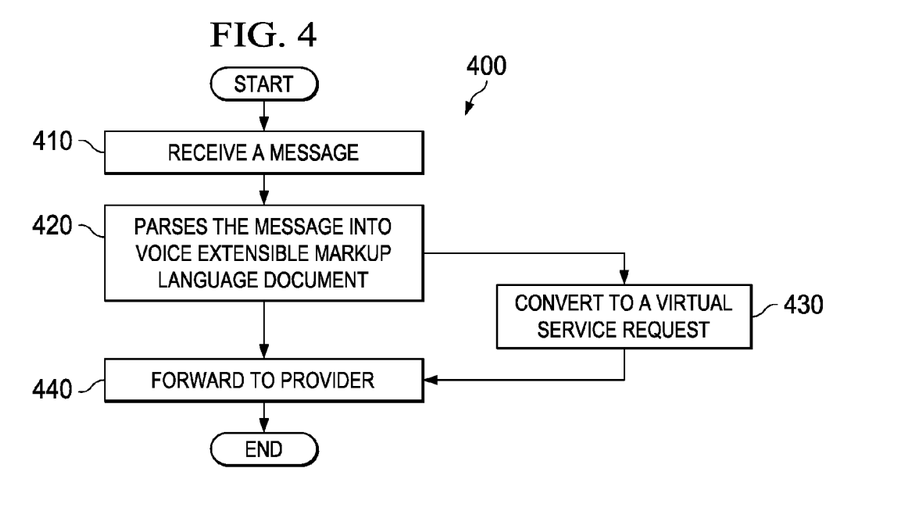
FIG. 4 is a flowchart of the various processing steps for using short messaging service for extending customer service deliver channels according to an illustrative embodiment.

Referring now to FIG. 4, a flowchart of the various processing steps for using short messaging service for extending customer service deliver channels is shown according to an illustrative embodiment. Process 400 is a software process, executing on a software component, such as voice extensible markup language engine 316 and speech synthesis software 320 of FIG. 3.

Process 400 begins by receiving a message utilizing the short messaging service protocol (step 410). The message can be text message 312 of FIG. 3. The message can be received from any short messaging service enabled device, such as short messaging service device 310 of FIG. 3.

Responsive to receiving the message, process 400 parses the message into a into voice extensible markup language document (step 420). The voice extensible markup language document can be voice extensible markup language message 318 of FIG. 3. The voice extensible markup language document contains the instructions from received text message. The voice extensible markup language document can then be utilized in a software engine in which voice extensible markup language documents can be used as input.

Responsive to converting the message into a voice extensible markup language document, process 400, can optionally convert to the voice extensible markup language document into a virtual service request (step 430). Speech synthesis software, such as speech synthesis software 320 of FIG. 3, can be implemented at a short message center, such that process 400 provides a message recipient with the virtual service request. Alternatively, the speech synthesis software can be implemented at the message recipient, such that process 400 provides the message recipient with the voice extensible markup language document that is then locally converted to the virtual service request.

Process 400 then forwards either the voice extensible markup language document or the virtual service request to a service provider (step 440), with the process terminating thereafter. If the voice extensible markup language document was not previously converted to a virtual service request, speech synthesis software, such as speech synthesis software 320 of FIG. 3, can be implemented at the message recipient to locally convert the voice extensible markup language document to the virtual service request.

Figure 5:
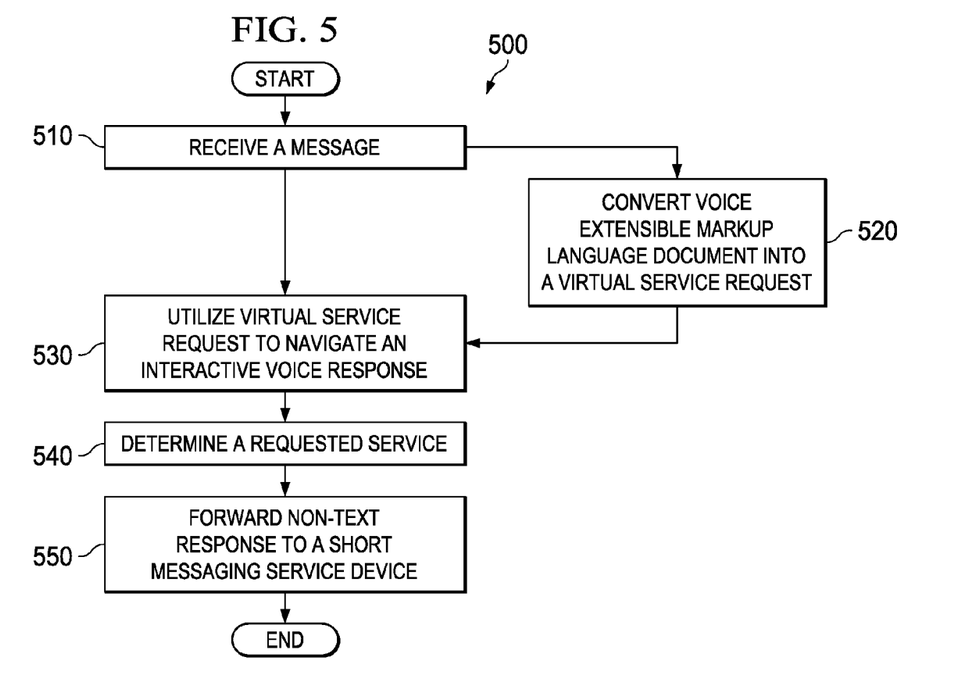
FIG. 5 is a flowchart of the various processing steps for using a virtual service request with a Voice User Interface according to an illustrative embodiment.

Referring now to FIG. 5, a flowchart of the various processing steps for using a virtual service request with a Voice User Interface is shown according to an illustrative embodiment. Process 500 is a software process, executing on a software component, such as Interactive voice response 326 of FIG. 3.

Process 500 begins by receiving either the voice extensible markup language document or the virtual service request (step 510). Speech synthesis software, such as speech synthesis software 320 of FIG. 3, can be implemented at a short message center, such that process 500 is provided with the virtual service request. In an alternate processing step, the speech synthesis software can be implemented at the message recipient, such that process 500 converts the voice extensible markup language document into a virtual service request (step 520).

Responsive to obtaining the virtual service request, either by the virtual service request being forwarded directly from the short message center, or by locally converting the voice extensible markup language document to the virtual service request, process 500 utilizes the virtual service request to navigate an interactive voice response (step 530). The interactive voice response can be interactive voice response 326 of FIG. 3. The interactive voice response is a software component that that allows process 500 to detect voice commands provided by the virtual service request.

Responsive to navigating the interactive voice response, process 500 determines a requested service (step 540). The requested service is one that is identified in the initial text message sent by the short messaging service device. Responsive to identifying the requested service, process 500 generates a non-text response, and forwards the non-text response to a short messaging service device (step 550). The short messaging service device can be short messaging service device 310 of FIG. 3.

The non-text response is a response to the original text message sent by the short messaging service device. The non-text response does not utilize the short messaging service protocol. The non-text response can be a telephone call from an operator or customer service. Similarly, the non-text response can be a prerecorded or generated voice message confirming receipt of the text message.

Figure 6:
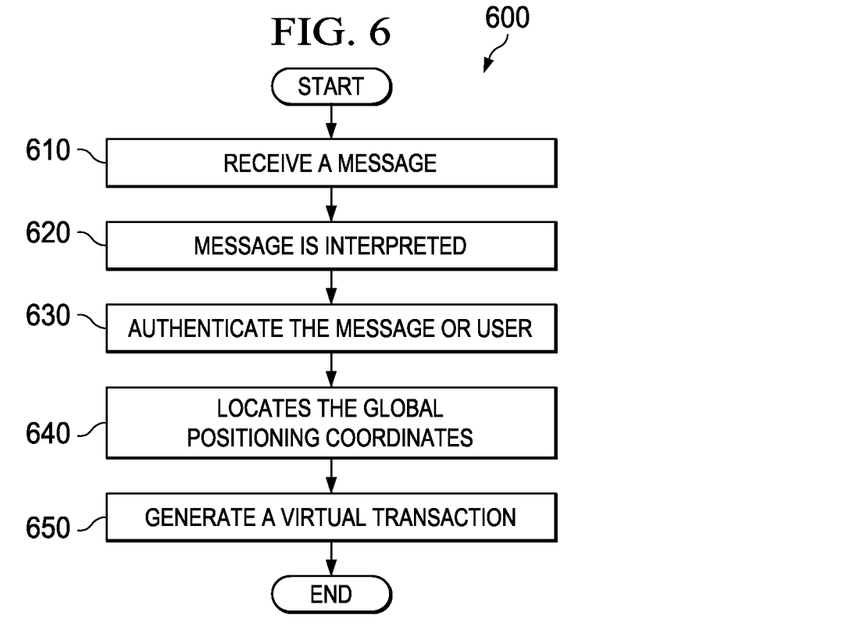
FIG. 6 is flowchart for the processing of a service request according to an illustrative embodiment.

Referring now to FIG. 6, a flowchart for the processing of a service request is shown according to an illustrative embodiment. Process 600 is an illustrative embodiment of an emergency road response. Process 600 is a specific embodiment of process 400 of FIG. 4, and process 500 of FIG. 5. Process 600 provides a low cost value add that has not been exploited by traditional roadside insurance providers.

Process 600 begins when a short messaging service device sends a message utilizing the short messaging service protocol (step 610). The message can be text message 312 of FIG. 3. The message can be received from any short messaging service enabled device, such as short messaging service device 310 of FIG. 3. In the present illustrative embodiment, the message is a text message to an insurance company or service provider indicating that tow services are needed. Specifically, the text message may state:

"Main and Broadway; Need Tow"

The text message may be provided to the user's insurance company, or directly to the service provider, in this case, a tow company.

Process 600 receives the message, which is interpreted by the interactive voice response and voice extensible markup language browser (step 620). Process 600 parses the message into a into voice extensible markup language document, which can be voice extensible markup language message 318 of FIG. 3. The voice extensible markup language document contains the instructions from received text message. The voice extensible markup language document can then be utilized in a software engine in which voice extensible markup language documents can be used as input. Process 600 can then convert to the voice extensible markup language document into a virtual service request for use with the interactive voice response.

Responsive to interpreting the text message, process 600 can then authenticate the message or user account by using an automatic number identification received with the text message (step 630). Automatic Number Identification, or ANI, is a feature of telephony intelligent network services that permits subscribers to display or capture the telephone numbers of calling parties. Using the interactive voice response and the parsed message, process 600 locates the global positioning coordinates of the sending short messaging service device (step 640).

Process 600 then generates a virtual transaction (step 650), with the process terminating thereafter. The virtual transaction is held in queue and routed to an agent at the service provider. Process 600 can then connect an agent to the stranded user by a non-text response to inform the user that help is on the way. The non-text response can be non-text response 328 of FIG. 3.

Alternatively, the virtual transaction can be submitted to a contractor operating a towing service. The towing service dispatches a tow truck to the identified location where services are needed. Process 600 can then connect either a service representative or the specific contractor servicing the received message to the stranded user for confirmation of the receipt of the message.

Figure 7:
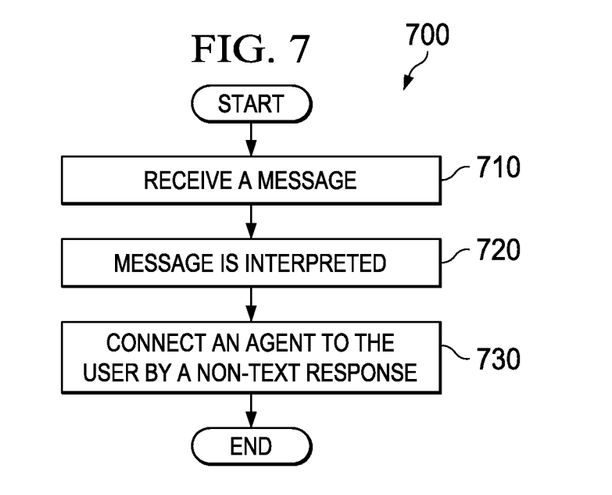
FIG. 7 is a flowchart for the processing of a service request is shown according to an illustrative embodiment.

Referring now to FIG. 7, a flowchart for the processing of a service request is shown according to an illustrative embodiment. Process 700 is an illustrative embodiment of a call back response. Process 700 is a specific embodiment of process 400 of FIG. 4, and process 500 of FIG. 5.

Process 700 begins when a short messaging service device sends a message utilizing the short messaging service protocol (step 710). The message can be text message 312 of FIG. 3. The message can be received from any short messaging service enabled device, such as short messaging service device 310 of FIG. 3. In the present illustrative embodiment, the message is a text message to reschedule an airline flight. Specifically, the text message may state: "Resch Flight 2291; Agent".

The text message may be provided directly to the service provider, in this case, an airline company.

Process 700 receives the message, which is interpreted by the interactive voice response and voice extensible markup language browser (step 720). Process 700 parses the message into a into voice extensible markup language document, which can be voice extensible markup language message 318 of FIG. 3. The voice extensible markup language document contains the instructions from received text message. The voice extensible markup language document can then be utilized in a software engine in which voice extensible markup language documents can be used as input. Process 700 can then convert to the voice extensible markup language document into a virtual service request for use with the interactive voice response. The virtual transaction is held in queue and routed to an agent at the service provider.

Process 700 can then connect an agent to the user by a non-text response (step 730), with the process terminating thereafter. The agent can then talk with the user about any possible options regarding the rescheduling of the flight. The non-text response can be non-text response 328 of FIG. 3.

Thus, the illustrative embodiments describe a computer implemented method, a computer program product, and a data processing system for using short messaging service for extending customer service deliver channels. Other service delivery channels can be used in the request/response model typical of short messaging service technology. The response can utilize a different channel than data, or short messaging service message responses. A short messaging service message can be transmitted by a user to a contact center. The contact center/data center can incorporate specific logic to processes the short messaging service message. The processing of the short messaging service by the data center alleviates the use of a traditional voice user interface (VUI) for service. Instead, the text in the short messaging service message can be interpreted by the business logic and non-textual response can be provided to the message generating body.

A computer implemented method, a computer program product, and a data processing system use short messaging service for extending customer service deliver channels. A message utilizing a short messaging service protocol is received from a sender. Responsive to receiving the message utilizing the short messaging service protocol, the message is parsed into a voice extensible markup language document. A virtual service request is then created from the voice extensible markup language document. Responsive to creating the virtual service request from the voice extensible markup language document, a service is requested from a message recipient, facilitated by using the virtual service request. A non-textual response is then provided to the message sender.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer usable or computer readable medium providing program code for use by or in connection with a computer or any instruction execution system. For the purposes of this description, a computer usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for using short messaging service for extending customer service delivery channels, the method comprising:
   receiving a message from a short messaging service device by a short message center, wherein the message utilizes a short messaging service protocol;
   responsive to receiving the message utilizing the short messaging service protocol, parsing the message into a voice extensible markup language document by the short message center;
   responsive to parsing the message into the voice extensible markup language document, creating a virtual service request from the voice extensible markup language document by the short message center, wherein the virtual service request is used to navigate an interactive voice response of a message recipient;
   responsive to creating the virtual service request from the voice extensible markup language document, navigating the interactive voice response to request a service from the message recipient, wherein the navigating is facilitated by using the virtual service request; and
   responsive to navigating the interactive voice response to request a service from the message recipient, providing a non-textual response to the short messaging service device by the message recipient, wherein the non-textual response is a telephone service call from an operator or customer service representative of the message recipient.

2. The computer implemented method of claim 1, wherein the step of receiving a message from the short messaging service device by a short message center further comprises:
   receiving the message, wherein the message is a text message received from a short messaging service protocol enabled portable device.

3. The computer implemented method of claim 1, wherein the step of receiving a message from the short messaging service device by a short message center further comprises:
   receiving the message, wherein the message comprises a text instruction to navigate the interactive voice response.

4. The computer implemented method of claim 1, further comprising:
   creating the virtual service request from the voice extensible markup language document, wherein the virtual service request is created using a speech synthesis software.

5. The computer implemented method of claim 3, wherein the step of requesting a service from a voice user interface further comprises:

utilizing a virtual service request to navigate the interactive voice response of the message recipient.

6. The method of claim 1, wherein the step of receiving the message from a short messaging service device by a short message center further comprises:
receiving a message from the short messaging service device by the short message center, wherein the message is received at a short messaging service center;
wherein the step of parsing the message into a voice extensible markup language document further comprises:
parsing the message into a voice extensible markup language document at the short messaging service center.

7. A non-transitory computer storage medium having a computer program product encoded thereon for using short messaging service for extending customer service delivery channels, the computer program product comprising:
computer usable program code for receiving a message from a short messaging service device by a short message center, wherein the message utilizes a short messaging service protocol;
computer usable program code, responsive to receiving the message utilizing the short messaging service protocol, for parsing the message into a voice extensible markup language document by the short message center;
computer usable program code, responsive to parsing the message into the voice extensible markup language document, for creating a virtual service request from the voice extensible markup language document by the short message center, wherein the virtual service request used to navigate an interactive voice response of a message recipient; and
computer usable program code, responsive to creating the virtual service request from the voice extensible markup language document, for navigating the interactive voice response to request a service from the message recipient, wherein the navigating is facilitated by using the virtual service request;
computer usable program code, responsive to navigating the interactive voice response to request a service from the message recipient, for providing a non-textual response to the short messaging service device by the short message center, wherein the non-textual response is a telephone service call from an operator or customer service representative of the message recipient.

8. The computer storage medium of claim 7, wherein the computer usable program code for receiving a message from the short messaging service device by the short message center further comprises:
computer usable program code for receiving the message, wherein the message is a text message received from a short messaging service protocol enabled portable device.

9. The computer storage medium of claim 7, wherein the computer usable program code for receiving a message from the short messaging service device by the short message center further comprises:
computer usable program code for receiving the message, wherein the message comprises a text instruction for navigating the interactive voice response.

10. The computer storage medium of claim 7, the computer program product further comprising:
computer usable program code for creating the virtual service request from the voice extensible markup language document, wherein the virtual service request is created using a speech synthesis software.

11. The computer storage medium of claim 9, wherein the computer usable program code for requesting a service from a voice user interface further comprises:
computer usable program code for utilizing a virtual service request to navigate the interactive voice response of the message recipient.

12. The computer storage medium of claim 7, wherein the computer usable program code for receiving the message from the short messaging service device by the short message center further comprises:
computer usable program code for receiving a message from the short messaging service device by the short message center, wherein the message is received at a short messaging service center;
wherein the computer usable program code for parsing the message into a voice extensible markup language document further comprises:
computer usable program code for parsing the message into a voice extensible markup language document at the short messaging service center.

13. A data processing system of a short message center for using short messaging service for extending customer service delivery channels, the data processing system comprising:
a bus;
a storage device connected to the bus, wherein the storage device contains a computer usable code; and
a processing unit connected to the bus, wherein the processing unit executes the computer usable program code to receive a message from a short messaging service device by a short message center, wherein the message utilizes a short messaging service protocol; responsive to receiving the message utilizing the short messaging service protocol, to parse the message into a voice extensible markup language document; responsive to parsing the message into the voice extensible markup language document, to create a virtual service request from the voice extensible markup language document, wherein the virtual service request used to navigate an interactive voice response of a message recipient; responsive to creating the virtual service request from the voice extensible markup language document, to navigate the interactive voice response to request a service from the message recipient, wherein the navigating is facilitated by using the virtual service request; and to provide a non-textual response to the short messaging service device by the short message center, wherein the non-textual response is a telephone service call from an operator or customer service representative of the message recipient.

14. The data processing system of claim 13, wherein the processing unit executing the computer usable program code to receive a message from the short messaging service device by the short message center further comprises:
the processing unit executing the computer usable program code to receive the message, wherein the message is a text message received from a short messaging service protocol enabled portable device.

15. The data processing system of claim 13, wherein the processing unit executing the computer usable program code to receive a message from the short messaging service device by the short message center further comprises:
the processing unit executing the computer usable program code to receive the message, wherein the message comprises a text instruction for navigating an interactive voice response.

16. The data processing system of claim 13, wherein the processing unit further executes the computer usable program code to create the virtual service request from the voice extensible markup language document, wherein the virtual service request is created using a speech synthesis software.

17. The data processing system of claim 15, wherein the processing unit executing the computer usable program code to request a service from a voice user interface further comprises:
   the processing unit executing the computer usable program code to utilize a virtual service request to navigate the interactive voice response of the message recipient.

18. The data processing system of claim 13, wherein the processing unit executing the computer usable program code to receive the message from the short messaging service device by the short message center further comprises:
   the processing unit executing the computer usable program code to receive the message from the short messaging service device by the short message center, wherein the message is received at a short messaging service center;
   wherein the processing unit executing the computer usable program code to parse the message into a voice extensible markup language document further comprises:
   the processing unit executing the computer usable program code to parse the message into a voice extensible markup language document at the short messaging service center.

* * * * *